US012093806B1

(12) United States Patent
Zejda et al.

(10) Patent No.: US 12,093,806 B1
(45) Date of Patent: Sep. 17, 2024

(54) STATIC MEMORY ALLOCATION FOR NEURAL NETWORK INFERENCE

(71) Applicant: Amazon Technologies, Inc., Seattle, WA (US)

(72) Inventors: Jindrich Zejda, Saratoga, CA (US); Ron Diamant, Santa Clara, CA (US); Jeffrey T. Huynh, San Jose, CA (US); Drazen Borkovic, Los Altos, CA (US); Randy Renfu Huang, Morgan Hill, CA (US); Richard John Heaton, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1041 days.

(21) Appl. No.: 16/459,501

(22) Filed: Jul. 1, 2019

(51) Int. Cl.
*G06N 3/063* (2023.01)
*G06F 8/41* (2018.01)

(52) U.S. Cl.
CPC ............... *G06N 3/063* (2013.01); *G06F 8/41* (2013.01)

(58) Field of Classification Search
CPC .................................. G06N 3/063; G06F 8/41
See application file for complete search history.

(56) References Cited

U.S. PATENT DOCUMENTS

| | | | | |
|---|---|---|---|---|
| 10,387,214 | B1 * | 8/2019 | Christian | G06N 20/00 |
| 11,151,046 | B2 * | 10/2021 | Mathuriya | G06F 8/41 |
| 2017/0316306 | A1 * | 11/2017 | Katayama | G06N 3/063 |
| 2018/0247197 | A1 * | 8/2018 | Tucker | G06F 9/5038 |
| 2018/0314671 | A1 * | 11/2018 | Zhang | G06N 3/063 |
| 2019/0012295 | A1 | 1/2019 | Yinger et al. | |
| 2019/0114548 | A1 * | 4/2019 | Wu | H04W 72/1226 |
| 2019/0286972 | A1 * | 9/2019 | El Husseini | G06N 3/063 |
| 2019/0324759 | A1 * | 10/2019 | Yang | G06N 20/00 |
| 2020/0184320 | A1 * | 6/2020 | Croxford | G06N 3/048 |
| 2020/0249998 | A1 * | 8/2020 | Che | G06N 3/0454 |

OTHER PUBLICATIONS

NPL1 (Glow: Graph Lowering Compiler Techniques for Neural Networks, Apr. 3, 2019) (Year: 2019).*
NPL (Lin et al., "The Reliability of subgraphs in the Arrangement Graph", Jun. 2015) (Year: 2015).*

* cited by examiner

*Primary Examiner* — Chat C Do
*Assistant Examiner* — Noor Alkhateeb
(74) *Attorney, Agent, or Firm* — S. Scott Foster; Kowert, Hood, Munyon, Rankin & Goetzel, P.C.

(57) ABSTRACT

Static memory allocation may be performed for weight values across multiple processing units executing a neural network. A neural network may be received for execution across multiple processing units. A partitioning scheme may be applied to divide the neural network into subgraphs. The subgraphs may be assigned to different processing units. The weights for the operations of the subgraph may be statically allocated in dedicated caches for the processing units as part of the instructions to execute the neural network across the processing units.

18 Claims, 9 Drawing Sheets

STATIC MEMORY ALLOCATION FOR NEURAL NETWORK INFERENCE

BACKGROUND

The increasing popularity of using neural networks as a model to create and apply machine learning in various different applications, such as computer vision, speech recognition, and machine translation, among others, has provoked a reexamination of the ways in which underlying hardware technologies are used to train and execute neural networks. Because neural networks can involve large numbers of mathematical operations performed in parallel, adaptations of existing hardware technologies for executing neural networks have been explored, such as techniques for improving the performance of parallel mathematical operations in Central Processing Units (CPUs) and Graphics Processing Units (GPUs) for executing neural networks, along with the introduction of machine learning optimized processing units, such as Tensor Processing Units (TPUs), for increasing the capacity to perform the operations included in neural networks. To keep pace with the growing demand for neural network applications including larger and more complex data sets, additional techniques that can further increase the performance of hardware technologies to execute neural networks are highly desirable.

Figure 1:
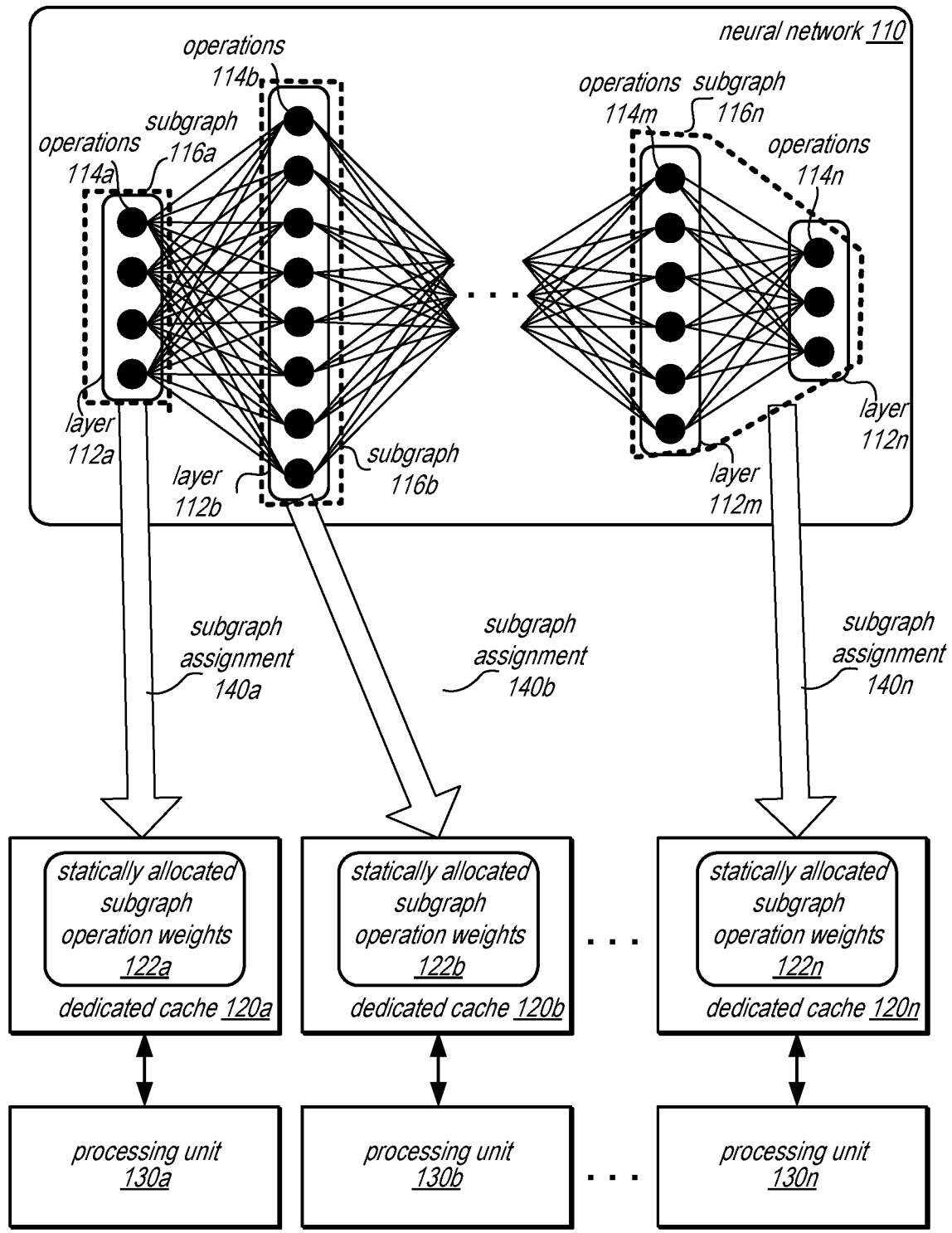
FIG. 1 illustrates a logical block diagram of static memory allocation for neural network inference, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various techniques of static memory allocation for neural network inference are described herein. In various embodiments, neural network models for implementing machine learning inference may include a graph that describes the computational dataflow between various operations and weight values ("weights") that are applied as part of the operations. The weights may be determined from training of the neural network with training data sets for the application in which the neural network is being applied (e.g., image data sets for recognize objects in images). Thus, in various embodiments, the weights may be pre-trained constants that are used as inputs to operators included in the data flow graph of the neural network. For example, resnet50 convolutional neural network may use about 50 CONV2D operators that in total have about 20 million weights. In such an example, each weight may be a float number, typically 16 or 32 bit. Thus, a neural network model trained with 16 bit weights may use 40 MB of weight.

Given the amount of storage used to hold large numbers of weights for application in the neural network, a dedicated cache for single processing unit, such as an L2 cache for single CPU core, GPU, or hardware accelerator like inference accelerator 220 discussed below in FIG. 2, may be unable to store all of the weights used to execute a neural network. In various embodiments, implementing static memory allocation for neural network inference may be implemented to take advantage of the increased dedicated cache capacity of a multiple processing unit solution for executing a neural network. For example, to avoid dynamic memory allocation of weights in dedicated cache (which may involve selectively loading and reloading weight values from a memory multiple times), the neural network may, in various embodiments, be partitioned into different subgraphs, which may then be assigned to different processing units so that the weights for the assigned subgraph(s) to an individual processing unit may fit within the dedicated cache (as well as saving storage space for other information used to execute the subgraph). Static memory allocation may thus improve the performance of systems executing neural networks by avoiding compile-time complexity, compute time to find valid block sizes and scheduling optimal re-load order that would otherwise be implemented as part of dynamic memory allocation, allowing a neural network compiler to generate the instructions to execute a neural network faster. Moreover, the performance of the processing units may also be improved as the weight values may be obtained from a dedicated cache faster than if the weights had to be read from a memory, as a dedicated cache may have substantially faster access times than a memory for the processing unit (e.g., little to no apparent latency of a dedicated cache versus detectable or apparent latency introduced when accessing a memory).

FIG. 1 illustrates a logical block diagram of static memory allocation for neural network inference, according to some embodiments. Neural network 110 may be provided (e.g., via an interface to a host system for executing neural networks as discussed below with regard to FIG. 2) for execution across multiple processing units, such as processing units 130a, 130b, and 130n. Neural network 110 may include multiple different layers as part of modeling, for instance, inference outputs of the neural network 110, such as layers 112a, 112b, 112m and 112n. These layers 112 may include one or multiple operations, such as the illustrated nodes that represent operations 114a, 114b, 114m and 114n in the respective layers 112. For example, operations may include convolution, fully-connected, pooling, normalization, and activation, in some embodiments.

As discussed in detail below with regard to FIGS. 3-8, different partitioning schemes may be applied to identify different subgraphs of the neural network 110, such as subgraphs 116a, 116b, and 116n. For example, different features of the operations in a subgraph may be considered, such as the number of weights used in the operations (as discussed below with regard to FIGS. 5, 7, and 8), the number of operations in a subgraph (as discussed below with regard to FIGS. 6 and 8), the expected/predicted execution time for operations in a subgraph (e.g., as discussed below with regard to FIGS. 7 and 8), among other partitioning schemes. In some partitioning schemes, partitions into subgraphs 116 may be restricted to contiguous subgraphs, whereas in other partitioning schemes (as discussed below with regard to FIG. 8) non-contiguous sub-graphs may be used.

Instructions to assign the subgraphs, such as subgraph assignments 140a, 140b and 140n, to an individual processing unit 130 may be made. When performed, these instructions may cause the weights for the operations in a sub graph to be statically allocated to a portion of a dedicated cache for processing unit 130. For example, statically allocated subgraph operation weights 112a may be loaded from a memory (not illustrated) into the dedicated cache 120a for processing unit 130a. Weights 112a may be for a single subgraph, or, in other cases, may be for multiple subgraphs assigned to the same processing unit 130. Similar static allocations for different subgraphs, as illustrated at 122b and 122n, for dedicated caches 120b and 120n may be made. In this way, the operation weights 122 that are statically allocated in dedicated caches 120 may not be overwritten or removed from a dedicated cache while executing neural network 110.

Please note that the previous description of a neural network 110, dedicated cache 120, static allocation 122, processing unit 130, subgraph assignment 140 are merely provided as an examples of static memory allocation for neural network inference. Different numbers of components or configuration of components may be implemented. For example, the size of dedicated caches and processing units used to execute a neural network may have different storage and/or processing capacities.

This specification begins with general descriptions of a neural network compiler and inference accelerator, which may implement static memory allocation for neural network inference. Various examples of different components/modules, or arrangements of components/modules that may be implemented in the compiler and inference accelerator may then be discussed. A number of different methods and techniques to static memory allocation for neural network inference are then discussed, some of which are illustrated in accompanying flowcharts. Various examples are provided throughout the specification.

Figure 2:
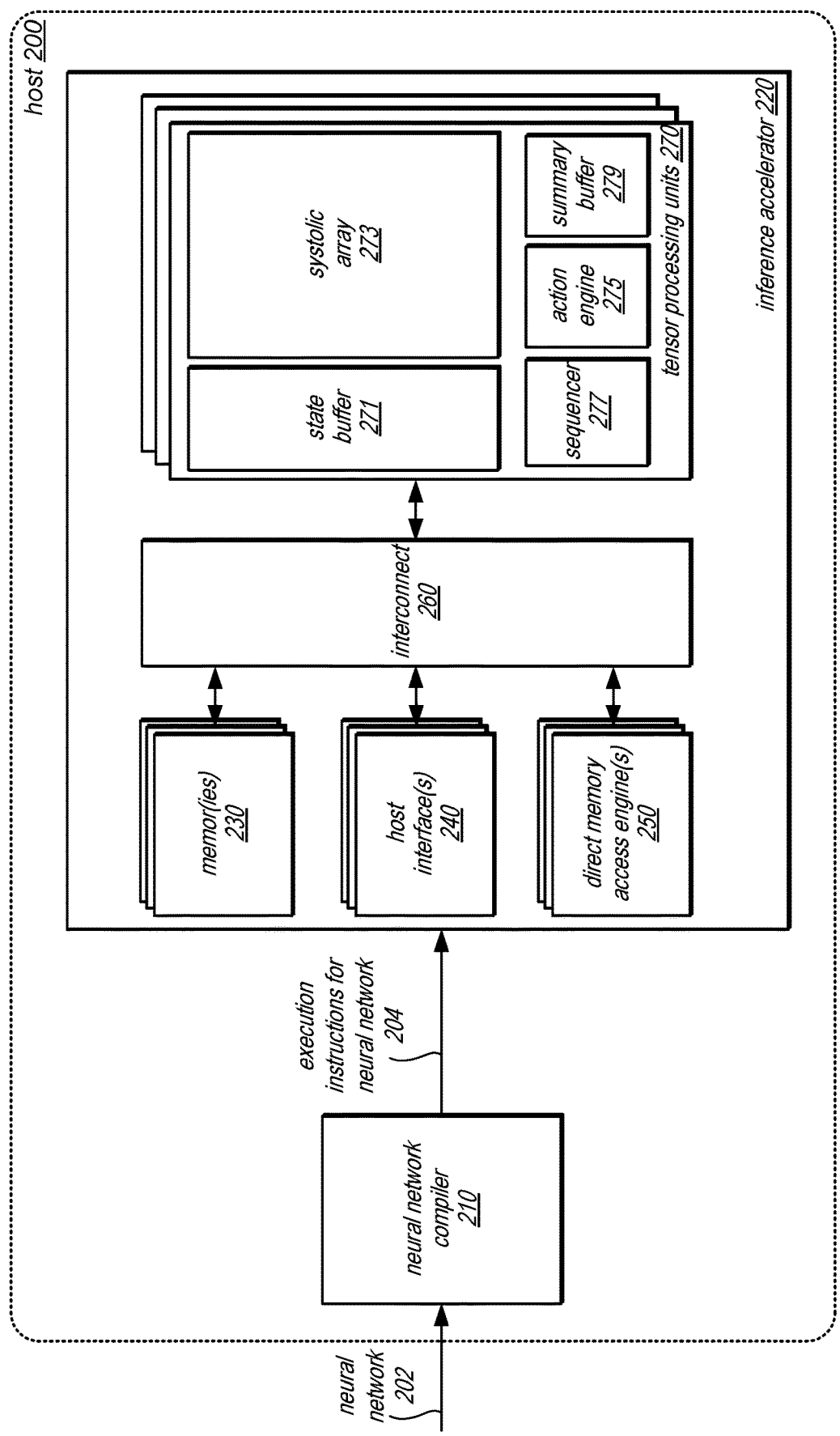
FIG. 2 is a logical block diagram illustrating a host that implements a neural network compiler that provides instructions to an inference accelerator, according to some embodiments.

FIG. 2 is a logical block diagram illustrating a host that implements a neural network compiler that provides instructions to an inference accelerator, according to some embodiments. Host 200 may be a computing system, like computing system 1000 discussed below with regard to FIG. 9 or other computing platform that may implement a neural network compiler 210 to receive a neural network 202 and generate execution instructions 204 to execute the neural network on processing units, such as tensor processing units 270 implemented as part of inference accelerator 220. Host 200 may implement an interface (not illustrated) via which neural network 202 may be received (e.g., a command or instruction that triggers an upload protocol or file transfer for the neural network). In some embodiments host 200 may be implemented as part of a network-based service that offers client applications the capability to create, train, upload and/or execute neural networks on service computing resources which may be selected based on their hardware and/or software capabilities to support different types of neural network applications (e.g., image recognition, speech recognition, sentiment recognition, etc.). In some embodiments (not illustrated) neural network compiler 210 may be implemented separately from inference accelerator (e.g., on a different host) and the execution instructions may be provided over a network connection between the two hosts to allow inference accelerator 220 to load and execute the neural network.

Neural network compiler 210 may include as part of instructions for neural network 204 assignments of subgraphs to be executed at different tensor processing units 270 and static allocations of state buffer 271 for the tensor processing unit to store weights for the operations in the assigned subgraphs, as discussed in detail below with regard to FIGS. 3-8. Inference accelerator 220 (or portions thereof, such as individual tensor processing units 270) may be implemented as an application specific integrated circuit (ASIC), field programmable gate array (FPGA), system-on-a-chip (SoC), or other dedicated circuitry. Inference accelerator 220 may implement host interface(s) 240 to receive instructions and weights to execute a neural network. For example, host interface(s) 240 may include Peripheral Component Interconnect Express (PCIe) interface that can receive the instructions 204 and load them to memor(ies) 230.

Figure 9:
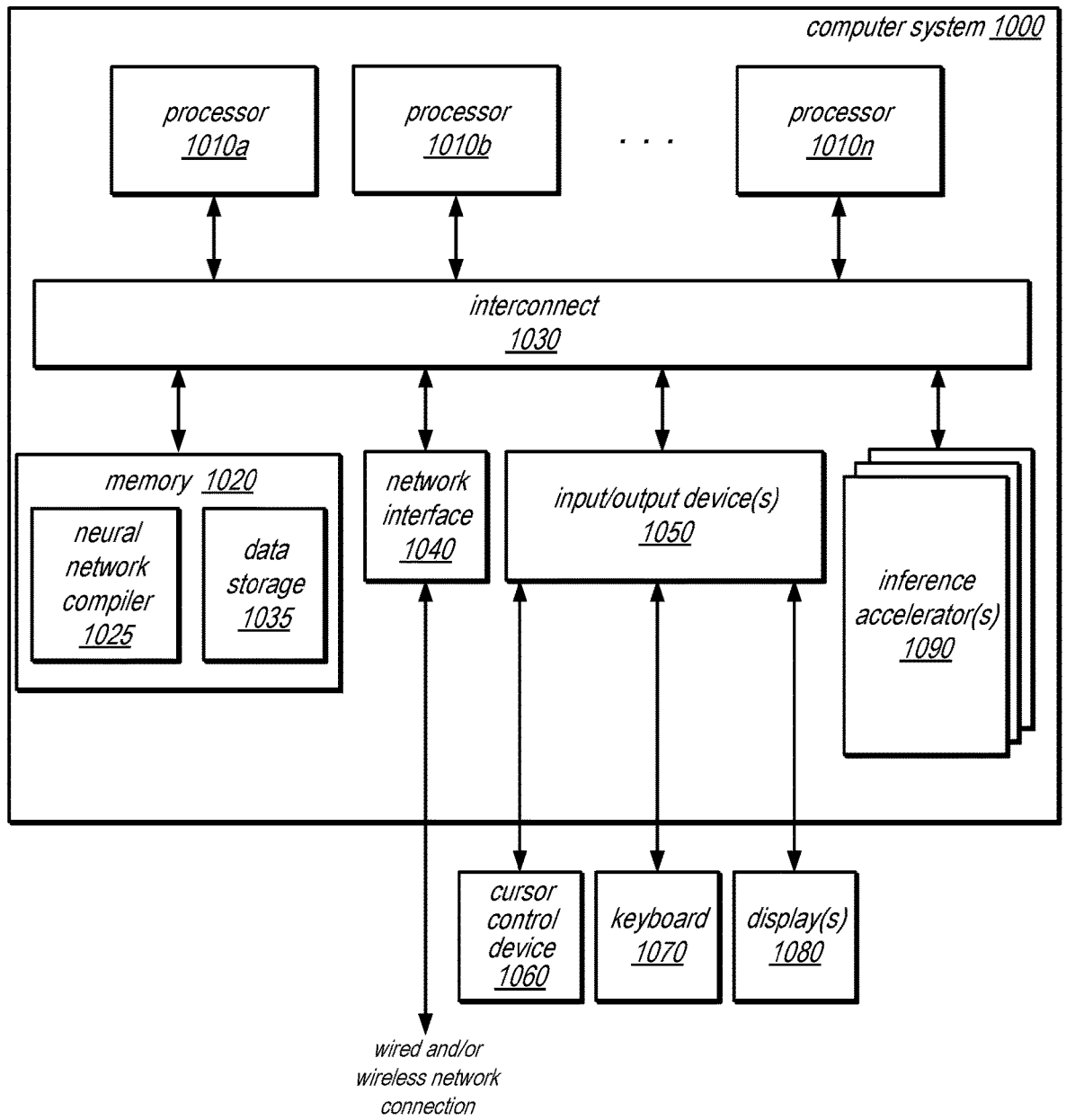
FIG. 9 is an example computer system, according to some embodiments.

In some embodiments, inference accelerator 220 may implement memor(ies) 230, such as Dynamic Random Access Memory (DRAM) (or other memory such as memory 1020 discussed below with regard to FIG. 9). Memor(ies) 230 may store instructions, weights and other data for executing a neural network (e.g., the input data for evaluation, such as input images for image recognition). In some embodiments, inference accelerator 220 may implement interconnect 260 to support communication amongst inference accelerator 220 components (e.g., host interface(s) 240, memor(ies) 230, direct memory access engine(s) 250, and tensor processing units 270. Interconnect 260 may implement one of many different kinds of bus architectures, such as an AXI fabric. In some embodiments, inference accelerator 220 may implement direct memory access (DMA) engine(s) 250. Direct memory access engine(s) 250 may support actions by tensor processing units 270 to, for instance, read, write, load, store, or otherwise access memor(ies) 230 to execute a neural network.

In some embodiments, inference accelerator 220 may implement tensor processing units 270 to perform various calculations in order to execute a neural network. Tensor processing units 270 may implement sequencer 277 which may obtain and decode the execution instructions 204 for the operations assigned to the tensor processing unit (e.g., those operations of an assigned subgraph) from memor(ies) 230. Sequencer 277 may use direct memory accessing engine(s) 250 to loads the weights and other information into state buffer 271 (which may be an on-chip memory, such as SRAM that acts as a dedicated cache for an individual tensor processing unit 270. In some embodiments, different tensor processing units may have different sizes of dedicated cache (and/or different sizes or shapes of a systolic array).

Tensor processing unit 270 may implement a systolic array 273 of processing elements which perform the operations of the assigned subgraph of the neural network according to the weights in state buffer. Different systolic arrays may be differently shaped (e.g., longer horizontally than vertically, or vice versa, as well as square shaped), in some embodiments providing a different processing capacity.

These processing elements may execute operations, such as multiply and accumulate operations, and then pass input data and weights to other elements in the array 273 for further processing. After array calculations the data may be passed to other functional units (not illustrated). For instance, after the systolic array 273, the data may go through normalization and then activation, which is a non-linear sum of the partial products (e.g. tanh or reLU). Data, such as input feature maps, filters, and output features may be processed through systolic array 273. Results may loop back through state buffer 271 for additional processing or pass through additional calculations at the output of the systolic array 273. In some embodiments, tensor processing units 270 may implement action engine 275, which may perform operations for pooling, residue-add, and/or general arithmetic logic unit (ALU) operations. In some embodiments, tensor processing units 270 may implement a summary buffer 279, which may serve as a buffer for absorbing the next set of systolic array 273 results, while pooling, activation, batch-normalization and/or reside-add are performed on the previous set of systolic array results.

Figure 3:
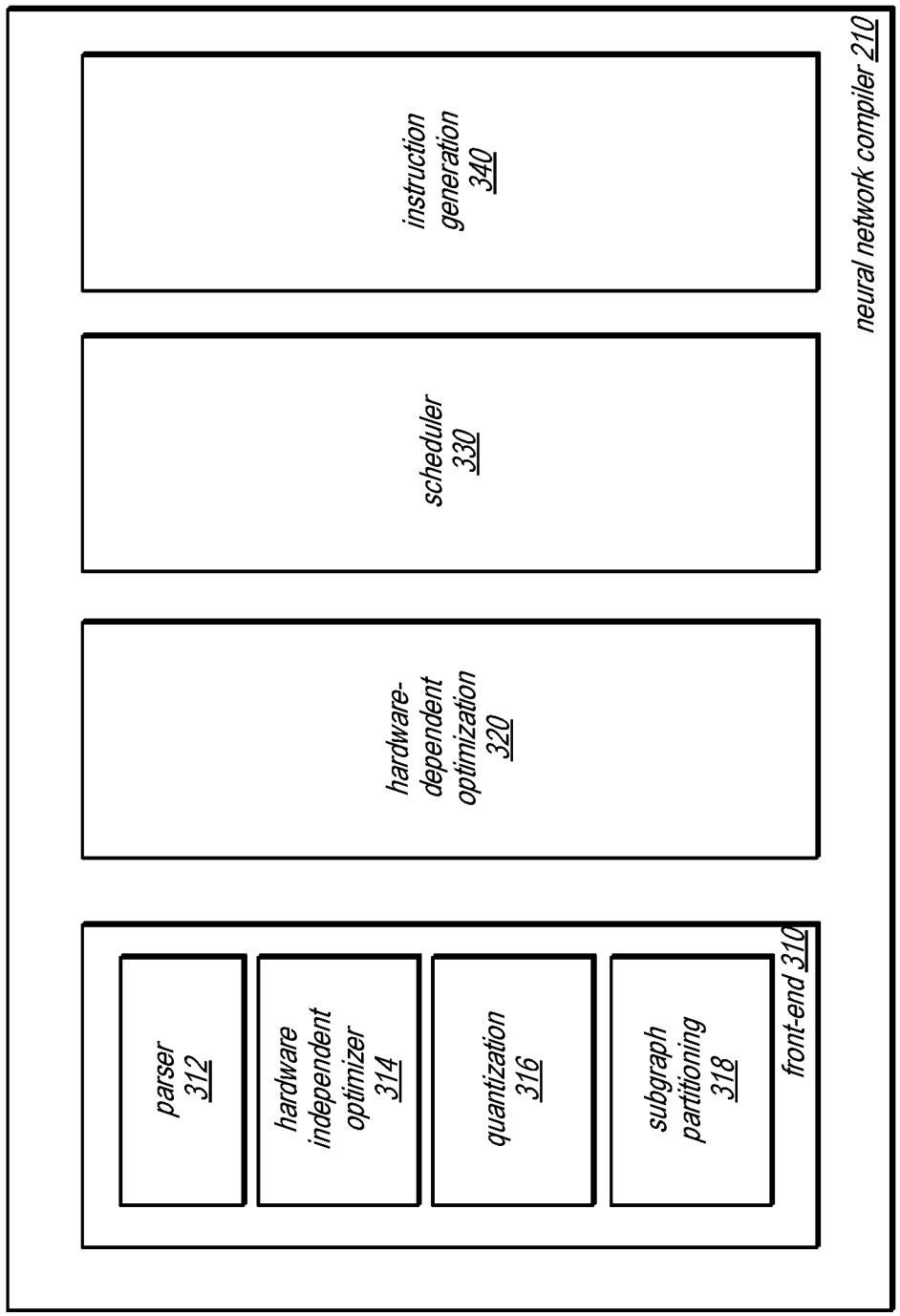
FIG. 3 is a logical block diagram illustrating a neural network compiler that partitions a neural network according to a partitioning scheme to include instructions for static memory allocation for neural network inference according to identified partitions, according to some embodiments.

FIG. 3 is a logical block diagram illustrating a neural network compiler that partitions a neural network according to a partitioning scheme to include instructions for statically memory allocation for neural network inference according to identified partitions, according to some embodiments. Neural network compiler 210 may implement a front-end 310 for performing various pre-processing or other operations to ready a received neural network for compilation, in some embodiments. For example, front-end 310 may implement parser 312, in some embodiments, to interpret different formats, languages, or frameworks for specifying a neural network, such as Apache's MXNet Deep Learning Framework, TensorFlow, and so on. Front-end 310 may implement hardware independent optimization features 314, such as operation pruning, precomputations, operation conversion and dissolving, which may result in an intermediate or optimized graph of the neural network, in some embodiments. Front end 316 may implement quantization 316, which may convert floating point arithmetic to integer arithmetic, in some embodiments.

In some embodiments, front-end 310 may implement subgraph partitioning 318 which may partition a neural network into different subgraphs (as discussed above with regard to FIG. 1) according to various partitioning schemes, as discussed below with regard to FIGS. 4-8. For example, subgraph partitioning may determine features, such as expected or predicted execution time of operations, size or number of weights, number of operations, or other measure of subgraphs for evaluation with respect to partitioning schemes. Subgraph partitioning 318 may include the instructions or update parameters or other state for the compilation of a neural network to include instructions that assign the subgraphs to different tensor processing units 270 and thus statically allocate the corresponding weights of the assigned subgraphs. Subgraph partitioning may determine from the received neural network (e.g., a framework or request parameter specified by a programmer/client/user) the configuration, capabilities, or number of tensor processing units to consider when partitioning, or may automatically determine the configuration, capabilities, or number of tensor processing units to consider. Subgraph partitioning 318 may receive a parameter, request, or other indication that specifies which subgraph partitioning scheme to apply or may determine automatically which partitioning scheme to apply. In some embodiments, subgraph partitioning may apply multiple partitioning schemes to select a best fit, least costly, most performant, or apply other evaluation criteria to determine which partitioning of the neural to use in the execution instructions.

In some embodiments, neural network compiler 210 may implement hardware-dependent optimization 320 may further optimize an intermediate or pre-processed graph of a neural network output from front-end 310. For example, hardware-dependent optimization 320 may access or receive the number and/or configuration of tensor processing units 270 available to execute the neural network, split operations in the graph (or subgraphs) into actionable units size according the tensor processing unit capabilities or input parameters. Hardware-dependent optimization 320 may specify the data dependency of the split operations. For example, hardware-dependent optimization 320 may apply scheduling primitives (e.g., split, reorder, cache_read, cache_write, pragma, tensorize, etc.) to manipulate the data shape of the operators and structure them into balanced, actionable units and specify the data dependency of the units.

In some embodiments, neural network compiler 210 may implement scheduler 330. Scheduler 330 may schedule the loads from memory (e.g., memory 230) into the state buffer (e.g., state buffer 271) and other tensor processing unit features, such as matmults. Scheduler 330 may schedule loads in order to anticipate and hide latency of loads from memory. Scheduler 330 may output timing profiles for execution. Instruction generation 340 may be implemented by neural network compiler 210. Instruction generation 340 may interpret the final graph (or subgraphs) along with associated metadata, parameters, or instructions into a final set of execution instructions. Instruction generation 340 may support instruction set architecture (ISAs) implemented by the underlying processing units (e.g., instructions that can be interpreted by the sequencer 277 of the tensor processing units 270 in FIG. 2).

The examples of a compiler and inference accelerator as discussed above with regard to FIGS. 1-3 have been given in regard to an example compiler and inference device. Note that various other types or configurations of compilers or inference devices may implement static memory allocation for neural network inference and thus may implement these techniques. In addition to examples given above, the techniques discussed below with regard to FIGS. 4-8 may be also implemented using the various components discussed above as well as different types of systems or devices that provide access to nonvolatile memory.

Figure 4:
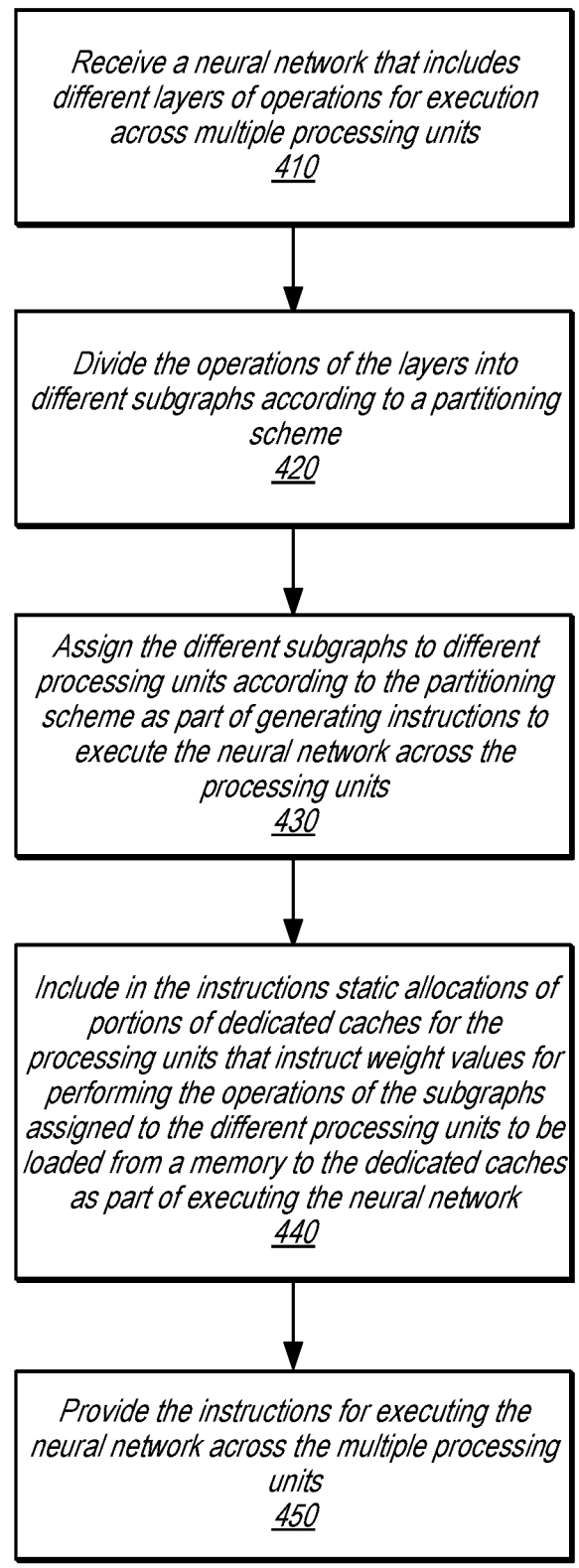
FIG. 4 is a high-level flowchart illustrating various methods and techniques to implement static memory allocation for neural network inference, according to some embodiments.

FIG. 4 is a high-level flowchart illustrating various methods and techniques to implement static memory allocation for neural network inference, according to some embodiments. As indicated at 410, a neural network may be received that includes different layers of operations for execution across multiple processing units. For instance, the neural network may be specified according to various ones of programming languages or frameworks, such as Mxnet, which may identify the operations, layers, weights, filters, and any other information used to execute the neural network. In some embodiments, the neural network may be received as part of or in response to a network request to a service interface that compiles and/or executes neural networks on behalf of clients of the service. In some embodiments, the neural network may copied, transferred, or sent from another network-based service (e.g., implemented as part of a provider network that offers multiple different network-based services) to the compilation and execution service. In some embodiments, features that configure the performance of compilation of the neural network may also be received (as part of or with the neural network, or in a separate request). For instance, the number of processing units to utilize may be specified in a request, the partitioning scheme to apply to the neural network may be specified in a request, and other execution parameters/features may be received as part of a request.

As indicated at 420, the operations of the layers of the neural network may be divided into subgraphs according to a partitioning scheme, in some embodiments. For example, different features of the operations in a subgraph may be considered, such as the number of weights used in the operations (as discussed below with regard to FIGS. 5, 7, and 8), the number of operations in a subgraph (as discussed below with regard to FIGS. 6 and 8), the expected/predicted execution time for operations in a subgraph (e.g., as discussed below with regard to FIGS. 7 and 8), among other partitioning schemes. In some partitioning schemes, partitions into subgraphs may be restricted to contiguous sub-graphs, whereas in other partitioning schemes (as discussed below with regard to FIG. 8) non-contiguous sub-graphs may be used. Partitioning schemes may also be configured, as well as selected, in some embodiments via requests to set/configure partitioning criteria or other parameters. For instance, weight or operation number thresholds may be specified as a percentage of dedicated cache in order to allow the assignment of subgraphs to processing units to be altered from one neural network to another.

As indicated at 430, the different subgraphs may be assigned to different processing units according to the partitioning scheme as part of generating instructions to execute the neural network across the processing units, in some embodiments. For example, the partitioning scheme may perform automatic detection or determination of a number of processing units to be utilized for executing a neural network. Thus, the assignment of processing units may exclude the use of surplus, available processing units greater than the determined number of processing units. In some embodiments, the partitioning scheme may assign partitions to processing units with different capabilities (e.g., in terms of processing or cache storage capacity). Thus, the assignment of a large subgraph with large weight size may be assigned to a correspondingly large processing unit capable of performing the assignment.

As indicated at 440, included in the instructions may be static allocations of portions of dedicated caches for the processing units that instruct weight values for performing the operations of the subgraphs assigned to the different processing units to be loaded from a memory to the dedicated caches as part of executing the neural network. For example, the instructions may include identifiers for subgraphs (or portions thereof) mapped to identifiers for processing units which may be interpreted when the instructions are decoded (e.g., by sequencer 277 in FIG. 2) to direct operations to load weights into the appropriate dedicated cache. In some embodiments, a parameter, identifier, or other feature of the instructions may identify the loaded weight values as read-only, or otherwise unable to written over during the execution of the neural network.

As indicated at 450, the instructions may be provided for executing the neural network across the multiple processing units, in various embodiments. For example, the instructions may be written to a memory for the processing units (e.g., memor(ies) 230), from which the instructions may then be loaded, read, or evaluated to begin execution of a neural network. In some embodiments, the instructions may be provided to a storage location (e.g., a library of compiled neural networks) that may be loaded for execution upon request to execute the neural network. In some embodiments, the compiled instructions may be sent back in response to a request to compile the neural network (e.g., over a network connection), such as in response to a request to a neural network compilation service.

Different partitioning schemes may be applied in different scenarios for determining and assigning subgraphs to different processing units. Some partitioning schemes, such as weight-based partitioning, may offer fast compilation speeds suitable for Just In Time (JIT) compilation or fast prototyping of a neural network to be performed on a new hardware design. Some partitioning schemes, such as operations-based partitioning, may offer better utilization and performance of processing units, while still offering fast compilation, such as scenarios where a hybrid accelerator (e.g., with different capacity processing units) is implemented or when attempting to obtain feedback on neural network and/or compilation performance. Some partitioning schemes, such as expected time-based partitioning schemes may provide higher performance at processing units while maximizing utilization of the processing units. Some partitioning schemes, such as partitioning schemes that combine multiple or subgraphs (including non-contiguous subgraphs) assigned to a processing unit, may also achieve high performance and utilization of processing units (with potentially less performant compilation times), and thus may be suitable for neural networks with unbalanced computation and data workloads.

Figure 5:
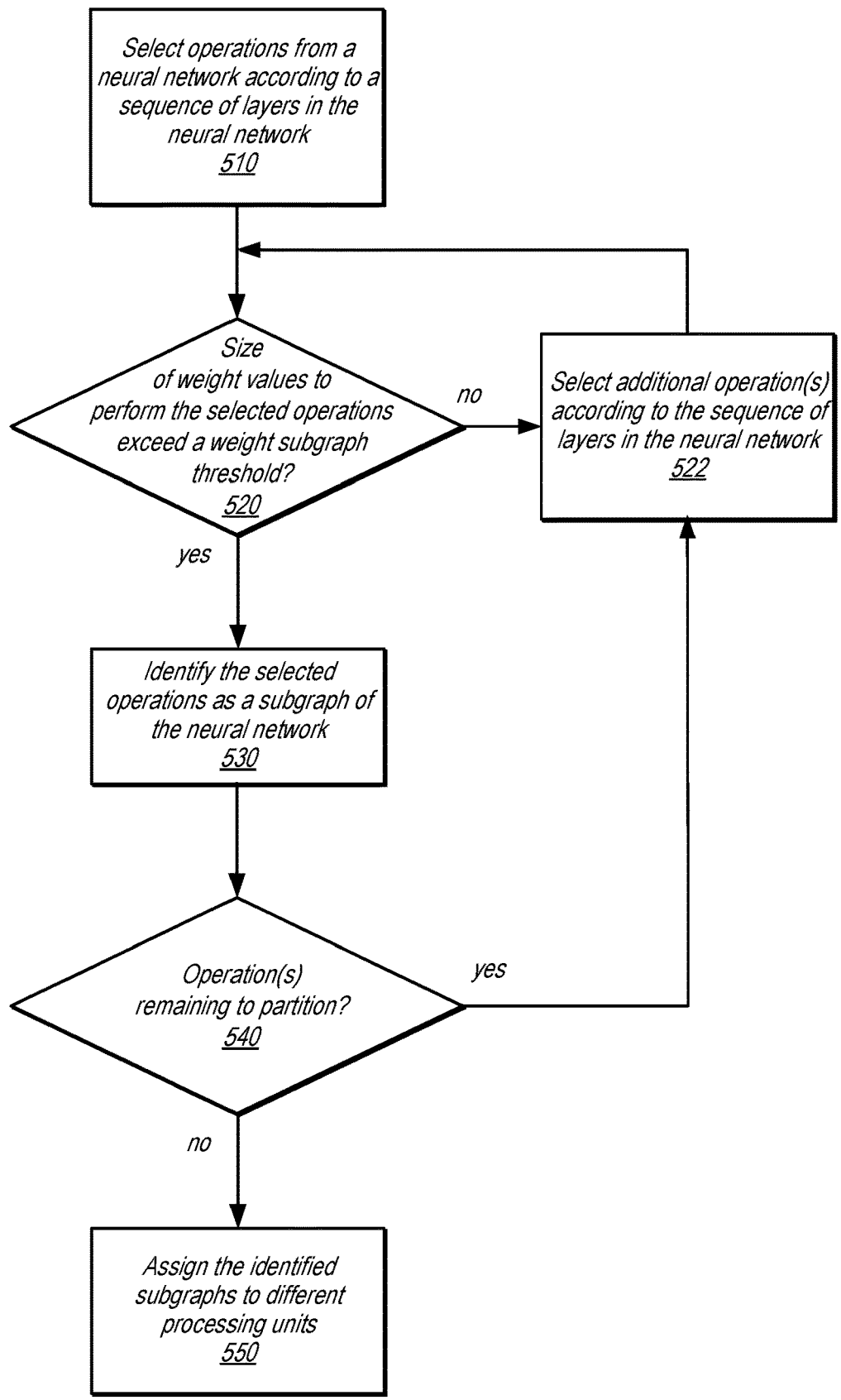
FIG. 5 is a high-level flowchart illustrating various methods and techniques to implement weight-balanced partitioning for static memory allocation for neural network inference, according to some embodiments.

The storage space used to hold weights for execution of a neural network in a processing unit may be one feature considered as part of a partitioning scheme. In some embodiments, the size of weight values may be determined according to the type of operator. In some embodiments, weight-balanced partitioning may divide a total weight size of a neural network into a number of available processing units (e.g., 40 MB divided by 8 processing units may result in determining subgraph partitions that use approximately 5 MB of weight to be assigned to each processing unit. In some embodiments, weight-based partitioning techniques that balance weight values of the subgraphs may minimize inter-processing unit communication. In some scenarios, other weight-based partitioning schemes may be applied. FIG. 5, for instance, is a high-level flowchart illustrating various methods and techniques to implement weight-balanced partitioning for static memory allocation for neural network inference, according to some embodiments.

As indicated at 510, operations may be selected from a neural network according to a sequence of layers in the neural network, in some embodiments. For example, selection may proceed from an input operator layer to an output operator layer or from an output operator layer in reverse to an input operator layer. Some (or all) of the operations of a layer may be selected. In some embodiments, operations may only be considered on a layer by layer basis (e.g., where subgraphs do not divide operations between different subgraphs), whereas in other embodiments, individual operation boundaries may be considered so that an operation from layer A is in subgraph A and a second operation from layer A is in subgraph B.

As indicated at 520, a size of weight values may be determined with respect to the selected operations and compared with a weight subgraph threshold, in various embodiments. For example, a weight subgraph threshold may be 75% of a dedicated cache (e.g., 9 MB of a 12 MB cache). If the selected weights do not exceed the weight subgraph threshold, then additional operations may be selected according to the sequence of layers, as indicated at 522 and evaluated again. In some embodiments, the weight subgraph threshold may estimate (or determine) other cache storage needs when evaluating the size of weight values (e.g., IFMAPs determined according to a scheduler) so that the total of the size of weight values and other cache storage needs does not exceed the capacity of the cache (e.g., size of weights+IFMAPs>12 MB).

If the size of weight values to perform the selected operations does exceed the weight subgraph threshold, then as indicated at 530, the selected operations may be identified as a subgraph of the neural network. The technique may be repeated if operations remain in the neural network be included in a subgraph, as indicated at 540. If all subgraphs have been identified, then the identified subgraphs may be assigned to different processing units, as indicated at 550. Note that in this technique not all processing units may be utilized. For example, Table 1 illustrates a subgraph assignment with that balances weight values but only utilizes 5 processing units of a possible 8.

TABLE 1

| Subgraph | Operation Count (Gops) | Weight Size (MB) |
|---|---|---|
| 1 | 4.685 | 10.383 |
| 2 | 1.31 | 10.884 |
| 3 | 0.35 | 8.51 |
| 4 | 0.35 | 8.506 |
| 5 | 0.249 | 10.413 |

Note that because of subgraph boundary limitations, in some embodiments (e.g., on operation or layer boundaries), the weight size may not be perfectly balanced though it may achieve substantially similar weight size balance across most if not all subgraphs. Table 1 also illustrates that the operation count of some subgraphs (e.g., subgraph 1) is much higher than others and thus the processing unit assigned subgraph 1 may be much slower in completing the execution of the neural network than other processing units with subgraphs with less operation counts.

Figure 6:
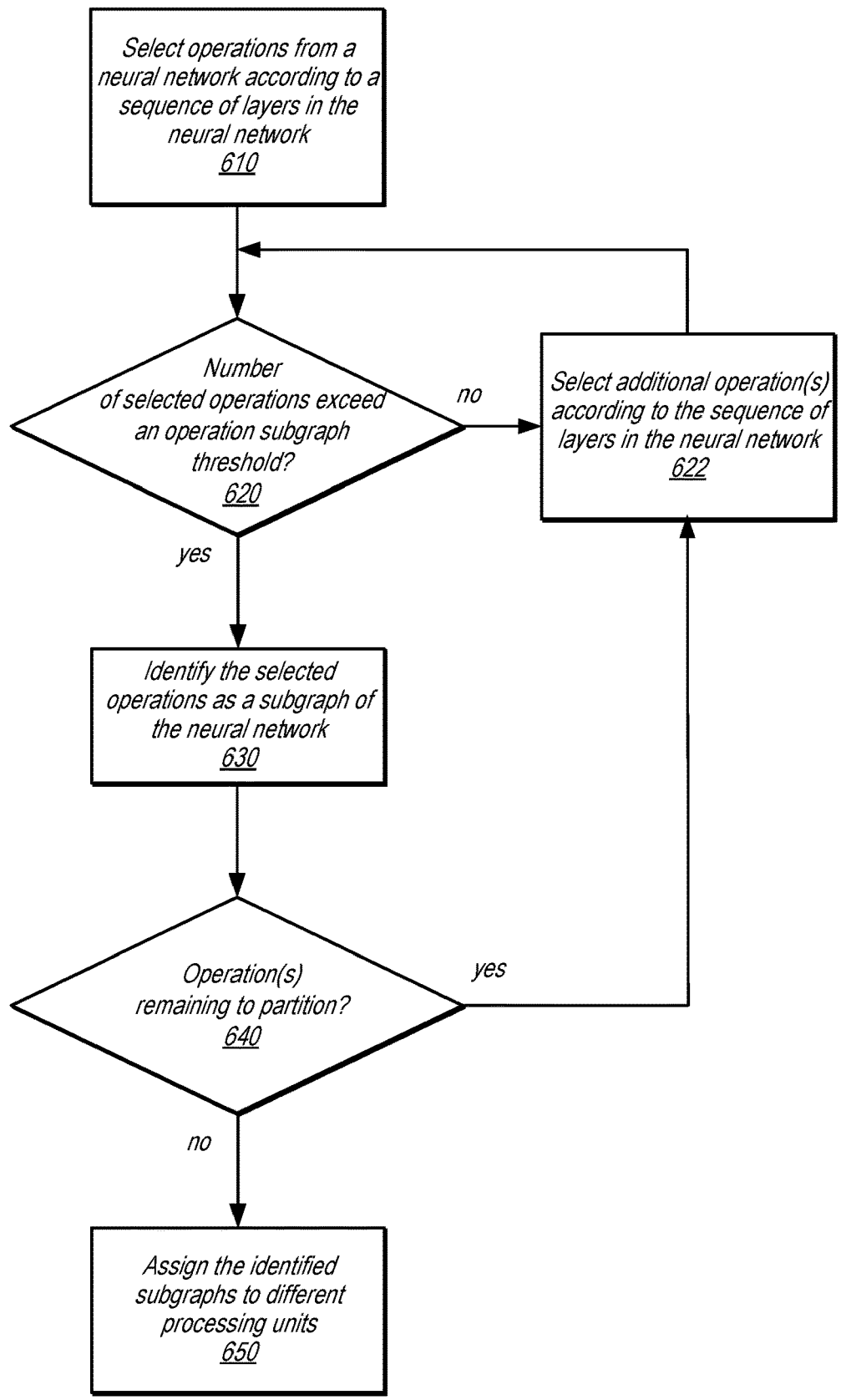
FIG. 6 is a high-level flowchart illustrating various methods and techniques to implement operation-balanced partitioning for static memory allocation for neural network inference, according to some embodiments.

As noted above, the operation count of subgraphs may be another feature to consider when partitioning a neural network into subgraphs. In this way, the workload of each processing unit may be more balanced, as execution of the neural network may only proceed as fast as the slowest processing unit, in some instances. In some embodiments, operation-balanced partitioning may divide a total number of operations a neural network into a number of available processing units (e.g., 32 divided by 8 processing units may result in determining subgraph partitions that use approximately 4 operations to be assigned to each processing unit). FIG. 6 is a high-level flowchart illustrating various other methods and techniques to implement operation-balanced partitioning for static memory allocation for neural network inference, according to some embodiments.

As indicated at 610, operations may be selected from a neural network according to a sequence of layers in the neural network, in some embodiments. As noted above, selection may proceed from an input operator layer to an output operator layer or from an output operator layer in reverse to an input operator layer. Some (or all) of the operations of a layer may be selected. In some embodiments, operations may only be considered on a layer by layer basis (e.g., where subgraphs do not divide operations between different subgraphs), whereas in other embodiments, individual operation boundaries may be considered so that an operation from layer A is in subgraph A and a second operation from layer A is in subgraph B.

As indicated at 620, a number of selected operations may exceed an operation subgraph threshold, in various embodiments. For example, an operation subgraph threshold may be determined according to a minimum use threshold (e.g. 1 operation=X % utilization so that the number of operations multiplied by X % is compared to a threshold percentage). If the selected operations do not exceed the operation subgraph threshold, then additional operations may be selected according to the sequence of layers, as indicated at 622 and evaluated again. In some embodiments, the weight of a subgraph may also be considered in order to insure that the subgraph does not exceed some maximum weight threshold (e.g., to prevent a subgraph from being identified that cannot execute on a single processing unit because the weights exceed the capacity of the dedicated cache).

If the number of operations does exceed the operation subgraph threshold, then as indicated at 630, the selected operations may be identified as a subgraph of the neural network. The technique may be repeated if operations remain in the neural network be included in a subgraph, as indicated at 640. If all subgraphs have been identified, then the identified subgraphs may be assigned to different processing units, as indicated at 650. Note that in this technique not all processing units may be utilized. Table 2 provides an example illustration of assignments according to a weight balanced technique.

TABLE 2

| Subgraph | Operation Count (Gops) | Weight Size (MB |
|---|---|---|
| 1 | 0.973 | 0.262 |
| 2 | 0.971 | 0.76 |
| 3 | 0.923 | 1.192 |
| 4 | 0.948 | 3.413 |
| 5 | 0.872 | 4.756 |
| 6 | 0.769 | 4.256 |
| 7 | 0.892 | 15.138 |
| 8 | 0.599 | 18.919 |

Figure 7:
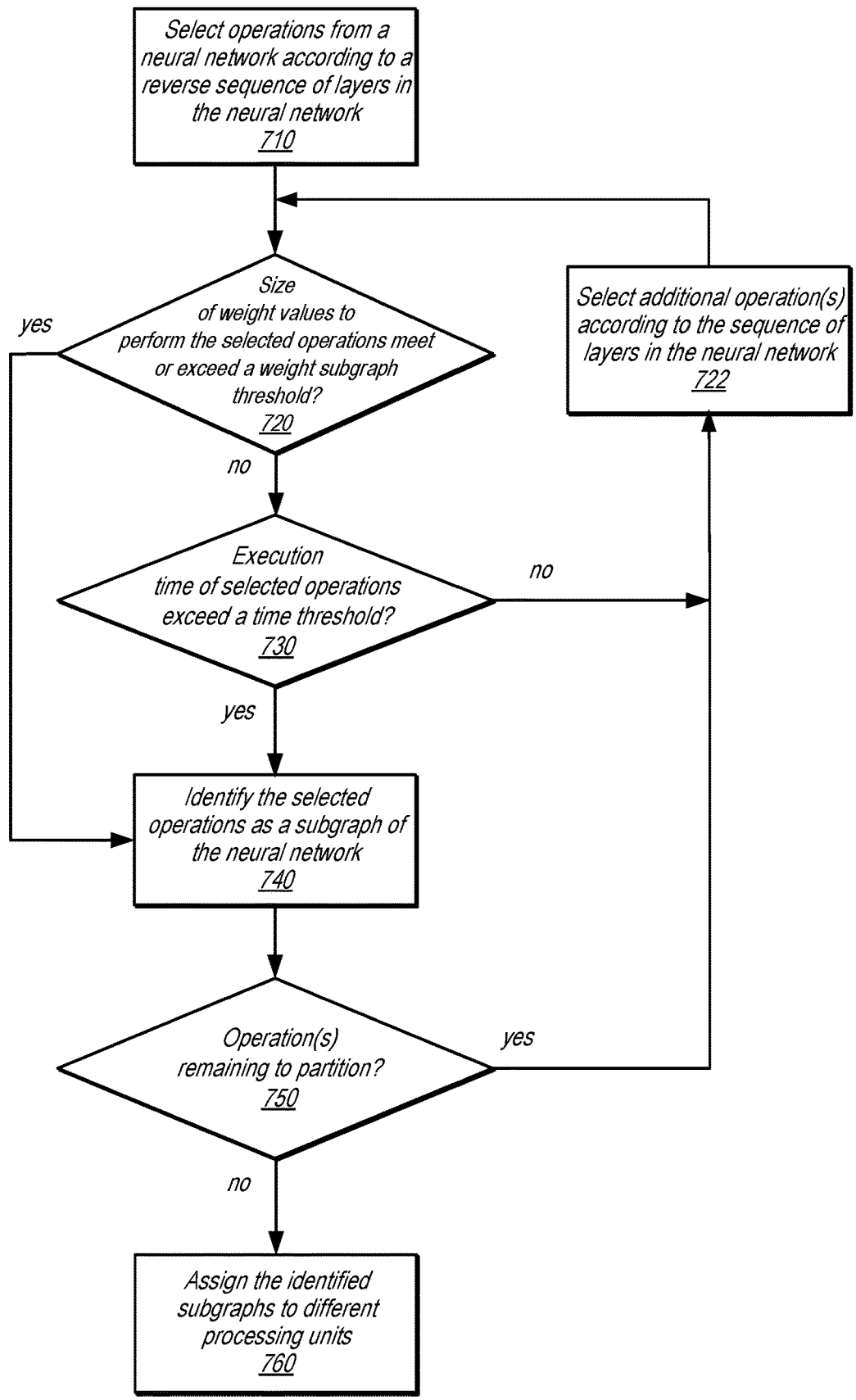
FIG. 7 is a high-level flowchart illustrating various methods and techniques to implement execution time-balanced partitioning for static memory allocation for neural network inference, according to some embodiments.
Figure 8:
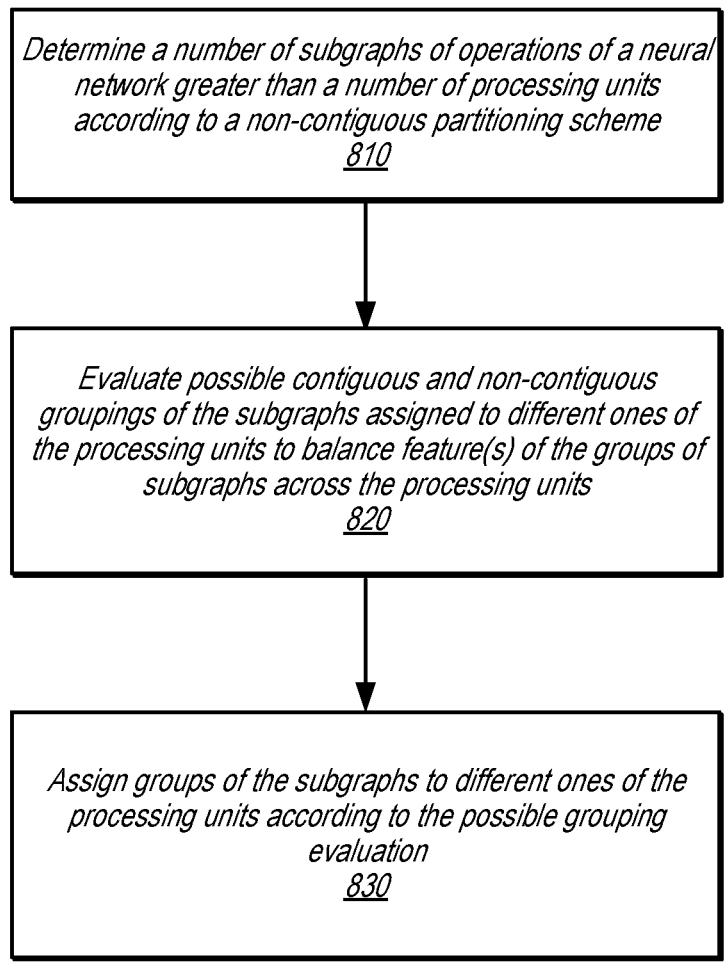
FIG. 8 is a high-level flowchart illustrating various methods and techniques to implement non-contiguous partitioning for static memory allocation for neural network inference, according to some embodiments.

Another feature to consider for a partitioning scheme is execution time of operations. Operation execution time may be predicted or estimated given the duplicative nature of operations performed in a processing unit implementing a systolic array (e.g., a same operation performed upon a same number of inputs and outputs may have a same execution time) as well as other components (e.g., execution time for action engine 275 operations and/or execution time for summary buffer 279 operations). Other time considerations, such as other processing unit latency for loading from and storing to a memory, pooling results, performing activation or other actions, saving partial results, and so on, may also be considered. The predicted execution time of a subgraph may be used to partition the neural network in time so that cycle time is balanced across processing units according to expected execution time. Consideration may also be given to the size of weights to prevent creating a subgraph that exceeds a dedicated caches capacity. FIG. 7 is a high-level flowchart illustrating various methods and techniques to implement execution time-balanced partitioning for static memory allocation for neural network inference, according to some embodiments.

As indicated at 710, operations may be selected from a neural network according to a reverse sequence of layers in the neural network, in some embodiments. As noted above, selection may proceed from an output operator layer in reverse to an input operator layer (as highest concentration of weight values may be at latter layers). Some (or all) of the operations of a layer may be selected. In some embodiments, operations may only be considered on a layer by layer basis (e.g., where subgraphs do not divide operations between different subgraphs), whereas in other embodiments, individual operation boundaries may be considered so that an operation from layer A is in subgraph A and a second operation from layer A is in subgraph B. In some other embodiments, a different ordering (such as non-reverse layer order) of selecting operations may be implemented.

As indicated at 720, similar to the discussion above in FIG. 5, a size of weight values may be determined with respect to the selected operations and compared with a weight subgraph threshold, in various embodiments. For example, a weight subgraph threshold may be 75% of a dedicated cache (e.g., 9 MB of a 12 MB cache) or a total size of weights divided by the number of processing units (e.g., 40 BM of weights divided by 8 processing units would be a 5 MB threshold per processing unit). In some embodiments, the weight subgraph threshold may estimate (or determine) other cache storage needs when evaluating the size of weight values (e.g., IFMAPs determined according to a scheduler) so that the total of the size of weight values and other cache storage needs does not exceed the capacity of the cache (e.g., size of weights+IFMAPs>12 MB).

If the selected weights do not meet or exceed the weight subgraph threshold, then a determination may be made to evaluate an expected execution time of the selected operations with respect to a time threshold, as indicated at 730, in some embodiments. For example, a time threshold may be a total expected time of executing the neural network divided by the number of processing units. In this way, the selected operations assigned to a processing unit may balance the expected execution time across the different processing units. If the execution time of selected operations does not exceed the time threshold, then additional operations may be selected according to the sequence of layers in the neural network, as indicated at 722, in some embodiments. If the execution time of selected operations does exceed the time threshold, then then as indicated at 740, the selected operations may be identified as a subgraph of the neural network If the size of weight values to perform the selected operations does meet or exceed the weight subgraph threshold, then as indicated at 740, the selected operations may be identified as a subgraph of the neural network. The technique may be repeated if operations remain in the neural network be included in a subgraph, as indicated at 750. If all subgraphs have been identified, then the identified subgraphs may be assigned to different processing units, as indicated at 760.

For example, the total execution time of the remaining operations may be determined and divided by remaining processing units so that each processing unit has a balanced amount of execution time. Table 3 provides an example illustration of a time-based partitioning scheme.

TABLE 3

| Subgraph | Execution Time (μSec) | Operation Count (Gops) | Weight Size (MB) |
|---|---|---|---|
| 1 | 46 | 0.46 | 10.4 |
| 2 | 42 | 0.64 | 10.5 |
| 3 | 88.4 | 1.35 | 11.26 |
| 4 | 92.9 | 1.42 | 6.4 |
| 5 | 91.6 | 1.4 | 3.44 |

TABLE 3-continued

| Subgraph | Execution Time (μSec) | Operation Count (Gops) | Weight Size (MB) |
|---|---|---|---|
| 6 | 66.9 | 0.93 | 1 |
| 7 | 79.4 | 0.65 | 0.21 |
| 8 | 78.7 | 0.68 | 0.15 |

In addition to partitioning schemes that do not break contiguous boundaries, non-contiguous portioning schemes (e.g., u-shape partitioning) may allow for both non-contiguous and contiguous subgraphs to be assigned to same processing units. Additionally, more subgraphs than processing units can be created in order to provide many possible, fine-grained combinations of assigning subgraphs to better balance workload (e.g., ops and/or time) with cache utilization for weights. In assignments made according to non-contiguous partitioning schemes, each processing unit can execute multiple programs or be statically ordered at compile time and saved as a single program.

As indicated at 810, a number of subgraphs of operations of a neural network greater than a number of processing units may be determined according to a non-contiguous partitioning scheme. For example, either weight, operations, expected time, or some combination thereof, may be applied to divide the operations into subgraphs of substantially equal or balanced values across 24 subgraphs when only 8 processing units are available.

As indicated at 820, possible contiguous and non-contiguous groupings of the subgraphs may be evaluated assigned to different processing units to balance feature(s) of the groups (e.g., weight, operations, and/or expected time) across the processing units). In some embodiments, other considerations such as the ordering or scheduling of the possible groupings may also be considered (e.g., to minimize ordering/scheduling impact on neural network performance). As indicated at 830, groups of the subgraphs may be assigned to different ones of the processing units according to the possible grouping evaluation, in some embodiments. For example, groups of contiguous or non-contiguous subgraphs may be considered (e.g., where a weighting scheme, such as valuing contiguous over non-contiguous grouping may be applied). Once selected, the instructions both to assign and coordinate the performance of non-contiguous groupings may be included, in some embodiments.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

Embodiments of a host system which may include or interact with an access device, microcontroller, and/or memory controller as discussed above may be implemented as part of a computer system. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 1000 includes one or more processors 1010 coupled to a system memory 1020 via an input/output (I/O) interface 1030. Computer system 1000 may include one or more inference accelerators 1090 (e.g., similar to processing units and inference accelerators discussed above with regard to FIGS. 1-8) which may execute neural networks according to instructions generated by neural network compiler 1025 (or another compiler not illustrated), in some embodiments. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions, such as program instructions to implement neural network compiler 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 2000 or may be distributed on various nodes of computer system 2000. In some embodiments, similar input/output devices may be separate from computer system 1000 and may interact with one or more nodes of computer system 1000 through a wired or wireless connection, such as over network interface 1040.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
an inference accelerator comprising a plurality of tensor processing units with respective on-board memories to implement respective state buffers for respective systolic arrays;
at least one processor;
a memory storing program instructions that when executed by the at least one processor cause the at least one processor to implement a neural network compiler, wherein the neural network compiler is configured to:
receive a neural network comprising a plurality of layers that comprise respective operations for execution across the plurality of tensor processing units of the inference accelerator;
access a configuration of the plurality of tensor processing units with the respective on-board memories;
based on the configuration, determine respective capacities of respectively dedicated caches for individual ones of the plurality of tensor processing units implemented in the respective on-board memories;
compile the neural network by:
dividing the respective operations of the plurality of layers into different subgraphs according to a partitioning scheme, wherein the dividing comprises:
determining a number of subgraphs greater than a number of the plurality of tensor processing units according to a non-contiguous partitioning scheme for dividing the respective operations of the plurality of layers into the different subgraphs;
evaluating different possible groupings of the different subgraphs, wherein a first one of the possible groupings includes two or more of the different subgraphs that are non-contiguous, wherein a second one of the possible groupings includes at least one of the two—or two or more different subgraphs with another one of the different subgraphs that are contiguous; and
selecting a grouping of the different possible groupings of the different subgraphs according to a balance of features of the selected grouping of the different subgraphs among the plurality of tensor processing units determined based on the evaluating; and
assigning the different subgraphs to different ones of the plurality of tensor processing units according to the selected grouping of the different subgraphs; and
including, in the instructions, static allocations of portions within the determined respective capacities of the respectively dedicated caches, wherein the static allocations of portions:
instruct weight values for the respective operations of the subgraphs assigned to the plurality of tensor processing units to be loaded from a memory to the static allocations of allocated portions of the respectively dedicated caches as part of executing the neural network; and
identify the static allocations of portions as read-only to prevent the weight values from being removed from or overwritten in the static allocations of portions, wherein the static allocations of portions save storage space in the respectively dedicated caches for loading other information used to execute the subgraph.

2. The system of claim 1, wherein the balance of features determined according to the evaluating compares respective sizes of the weight values of the respective operations in the subgraphs with a weight subgraph threshold.

3. The system of claim 1, wherein the balance of features determined according to the evaluating is a respective number of operations included in the different subgraphs across the different subgraphs.

4. The system of claim 1, wherein the balance of features determined according to the evaluating is a respective execution time for the respective operations included in the different subgraphs across the different subgraphs.

5. A method, comprising:
receiving a neural network comprising a plurality of layers that comprise respective operations for execution across a plurality of processing units of an inference accelerator;
accessing a configuration of the plurality of processing units of the inference accelerator;
based on the configuration, determining respective capacities of respectively dedicated caches for individual ones of the plurality of processing units of the inference accelerator;
dividing the respective operations of the plurality of layers into different subgraphs according to a partitioning scheme, wherein the dividing comprises:
determining a number of subgraphs greater than a number of the processing units according to a non-contiguous partitioning scheme for dividing the respective operations of the plurality of layers into the different subgraphs;
evaluating different possible groupings of the different subgraphs, wherein a first one of the possible groupings includes two or more of the different subgraphs that are non-contiguous, wherein a second one of the possible groupings includes at least one of the two or more different subgraphs with another one of the different subgraphs that are contiguous; and
selecting a grouping of the different possible groupings of the different subgraphs according to a balance of features of the selected grouping of the different subgraphs among the plurality of processing units of the inference accelerator determined based on the evaluating;
assigning the different subgraphs to different ones of the plurality of processing units of the inference accelerator according to the selected grouping of the different subgraphs as part of generating instructions to execute the neural network across the plurality of processing units of the inference accelerator; and
including, in the instructions, static allocations of portions within the determined respective capacities of the respectively dedicated caches, wherein the static allocations:
instruct weight values for the respective operations of the subgraphs assigned to the different ones of the plurality of processing units of the inference accelerator to be loaded from a memory to the static allocations of portions of the respectively dedicated caches as part of executing the neural network; and
identify the static allocations of portions as read-only to prevent the weight values from being removed from or overwritten in the static allocated portions, wherein the static allocations save storage space in the respectively dedicated caches for loading other information used to execute the subgraph.

6. The method of claim 5, wherein the balance of features determined according to the evaluating compares respective sizes of the weight values of the respective operations in the subgraphs with a weight subgraph threshold.

7. The method of claim 5, wherein the balance of features determined according to the evaluating compares respective numbers of operations included in the different subgraphs across the different subgraphs.

8. The method of claim 5, wherein the balance of features determined according to the evaluating compares the respective operations included in the one or more subgraphs.

9. The method of claim 5, wherein at least one of the dedicated caches for the plurality of processing units of the inference accelerator is a different size than another one of the dedicated caches and wherein the assigning the different subgraphs to the different ones of the plurality of processing units of the inference accelerator according to the partitioning scheme is further based on respective sizes of the dedicated caches of the plurality of processing units of the inference accelerator.

10. The method of claim 5, wherein assigning the different subgraphs to the different ones of the plurality of processing units of the inference accelerator according to the selected grouping of the different possible groupings comprises automatically determining a number of processing units to consider for assigning the subgraphs.

11. The method of claim 5, further comprising receiving a request to apply the partitioning scheme out of a plurality of partition schemes implemented by a neural network compiler that performs the dividing, the assigning, and the including.

12. One or more non-transitory, computer-readable storage media, storing program instructions that when executed on or across one or more computing devices cause the one or more computing devices to implement:
receiving a neural network comprising a plurality of layers that comprise respective operations for execution across a plurality of systolic arrays of an inference accelerator comprising respective processing elements;
accessing a configuration of the plurality of systolic arrays of the inference accelerator;
based on the configuration, determining respective capacities of respectively dedicated caches for individual ones of the plurality of systolic arrays of the inference accelerator;
dividing the respective operations of the plurality of layers into different subgraphs according to a partitioning scheme, wherein, in the dividing, the programming instructions cause the one or more computing devices to implement:
determining a number of subgraphs greater than a number of the systolic arrays of the inference accelerator according to a non-contiguous partitioning scheme for dividing the respective operations of the plurality of layers into the different subgraphs;
evaluating different possible groupings of the different subgraphs, wherein a first one of the possible groupings includes two or more of the different subgraphs that are non-contiguous, wherein a second one of the possible groupings includes at least one of the two or more different subgraphs with another one of the different subgraphs that are contiguous; and
selecting a grouping of the different possible groupings of the subgraphs according to a balance of features of the selected grouping of the different subgraphs among the plurality of systolic arrays of the inference accelerator determined based on the evaluating; and
assigning the different subgraphs to different ones of the systolic arrays of the inference accelerator according to the selected grouping of the different possible groupings as part of generating instructions to execute the neural network across the plurality of systolic arrays of the inference accelerator;
including, in the instructions, static allocations of portions within the determined respective capacities of the respectively dedicated caches, wherein the static allocations:
instruct weight values for the respective operations of the subgraphs assigned to the different systolic arrays of the inference accelerator to be loaded from a memory to the static allocated portions of the respectively dedicated caches as part of executing the neural network; and
identify the static allocated portions as read-only to prevent the weight values from being removed from or overwritten in the static allocated portions, wherein the static allocations save storage space in the respectively dedicated caches for other information used to execute the subgraph; and
storing the instructions to the memory for subsequent execution at the plurality of systolic arrays of the inference accelerator in order to execute the neural network.

13. The one or more non-transitory, computer-readable storage media of claim 12, wherein the balance of features determined according to the evaluating compares a respective size of weight values for the respective operations included in the different subgraphs across the different subgraphs.

14. The one or more non-transitory, computer-readable storage media of claim 12, wherein the balance of features determined according to the evaluating compares respective numbers of the respective operations in the different subgraphs with an operation subgraph threshold.

15. The one or more non-transitory, computer-readable storage media of claim 12, wherein the balance of features determined according to the evaluating compares a respective execution time for the respective operations included in the different subgraphs across the different subgraphs to identify the different subgraphs.

16. The one or more non-transitory, computer-readable storage media of claim 12, wherein at least one of the systolic arrays of the inference accelerator is a different size or shape than another one of the systolic arrays of the inference accelerator and wherein the assigning the different subgraphs to the different ones of the plurality of systolic arrays of the inference accelerator according to the partitioning scheme is further based on respective sizes or shapes of the systolic arrays of the inference accelerator.

17. The one or more non-transitory, computer-readable storage media of claim 12, wherein the one or more non-transitory, computer-readable storage media further comprise additional program instructions that when executed on or across the one or more computing devices cause the one or more computing devices to further implement:
receiving a request that specifies a number or configuration of systolic arrays of the inference accelerator to execute the neural network;
wherein the assigning the different subgraphs to the different ones of the systolic arrays of the inference accelerator is performed according to the specified number or configuration of systolic arrays of the inference accelerator.

18. The one or more non-transitory, computer-readable storage media of claim 12, wherein the accessing, the determining, the dividing, the including, and the storing are performed responsive to a request received via an interface at a network-based service to compile the neural network.

* * * * *